(12) United States Patent
Kim et al.

(10) Patent No.: US 9,758,903 B2
(45) Date of Patent: *Sep. 12, 2017

(54) POLYESTER FIBER FOR AIRBAG AND PREPARATION METHOD THEREOF

(75) Inventors: Young-Jo Kim, Gyeonggi-do (KR); Gi-Woong Kim, Daegu (KR); Sang-Mok Lee, Gumi-si (KR); Young-Soo Lee, Gumi-si (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,317

(22) PCT Filed: Apr. 14, 2010

(86) PCT No.: PCT/KR2010/002301
§ 371 (c)(1),
(2), (4) Date: Oct. 13, 2011

(87) PCT Pub. No.: WO2010/120107
PCT Pub. Date: Oct. 21, 2010

(65) Prior Publication Data
US 2012/0040167 A1    Feb. 16, 2012

(30) Foreign Application Priority Data

Apr. 14, 2009  (KR) .................. 10-2009-0032252
Apr. 23, 2009  (KR) .................. 10-2009-0035713

(51) Int. Cl.
*D01F 6/62* (2006.01)
*D03D 1/02* (2006.01)
*B60R 21/235* (2006.01)

(52) U.S. Cl.
CPC ............ *D01F 6/62* (2013.01); *B60R 21/235* (2013.01); *D03D 1/02* (2013.01);
(Continued)

(58) Field of Classification Search
CPC ............... D01F 6/62; Y10T 428/2969; Y10T 428/2913; D10B 2331/04; D03D 1/02; B60R 2021/23509
(Continued)

(56) References Cited

U.S. PATENT DOCUMENTS 4,101,525 A   7/1978  Davis et al.
4,491,657 A   1/1985  Saito et al.
(Continued)

FOREIGN PATENT DOCUMENTS

CN       1274022 A       11/2000
EP       0 666 344 A1    8/1995
(Continued)

OTHER PUBLICATIONS

US 4,491,657 (Saito et al.) marked up to show numerical values depicted in Figure 5, Jan. 1, 1985.*
(Continued)

*Primary Examiner* — Frank Vineis
(74) *Attorney, Agent, or Firm* — Sughrue Mion, PLLC (57) ABSTRACT

The present invention relates to a polyester fiber that can be applied to a fabric for an airbag, and particularly, to a polyester fiber having elongation of 0.5% or more at a stress of 1.0 g/d, elongation of 4.3% or more at a stress of 4.0 g/d, and elongation of 7.5% or more at a stress of 7.0 g/d, and an initial modulus of 40 to 100 g/d, a method of preparing the same, and a fabric for an airbag prepared therefrom. Since the polyester fiber of the present invention remarkably decreases stiffness and secures superior mechanical properties, it is possible to provide superior packing properties, dimensional stability, and gas barrier effect, and to protect occupants safely by minimizing the impact applied to the occupants, when it is used for the fabric for an airbag.

24 Claims, 2 Drawing Sheets

(52) U.S. Cl.
CPC *B60R 2021/23509* (2013.01); *D10B 2331/04* (2013.01); *Y10T 428/249921* (2015.04); *Y10T 428/298* (2015.01); *Y10T 428/2913* (2015.01)

(58) Field of Classification Search
USPC .......... 442/59; 428/357, 364, 375, 394, 395, 428/480, 482
See application file for complete search history.

(56) References Cited

U.S. PATENT DOCUMENTS

| | | | |
|---|---|---|---|
| 5,474,836 A * | 12/1995 | Nishimura et al. | 442/301 |
| 5,637,385 A | 6/1997 | Mizuki et al. | |
| 5,989,660 A * | 11/1999 | Moriwaki | B60R 21/235 |
| | | | 139/384 R |
| 6,511,624 B1 | 1/2003 | Cho et al. | |
| 6,835,447 B2 | 12/2004 | Manabe et al. | |
| 7,014,914 B2 * | 3/2006 | Keshavaraj | 428/364 |
| 2001/0001689 A1 | 5/2001 | Tang et al. | |
| 2005/0153609 A1 | 7/2005 | Keshavaraj | |
| 2007/0243378 A1 | 10/2007 | Cho et al. | |
| 2008/0014816 A1 * | 1/2008 | Schmitt | B60R 21/235 |
| | | | 442/76 |

FOREIGN PATENT DOCUMENTS

| | | |
|---|---|---|
| EP | 1 054 084 A1 | 11/2000 |
| JP | 57-154410 A | 9/1982 |
| JP | 06-128836 A | 5/1994 |
| JP | 6-184286 A | 7/1994 |
| JP | 06-306729 A | 11/1994 |
| JP | 6-306731 A | 11/1994 |
| JP | 06-313265 A | 11/1994 |
| JP | 06306730 A * | 11/1994 |
| JP | 0748717 A | 2/1995 |
| JP | 07-090746 A | 4/1995 |
| JP | 7-90747 A | 4/1995 |
| JP | 07090746 A * | 4/1995 |
| JP | 8-11660 A | 1/1996 |
| JP | 08-035116 A | 2/1996 |
| JP | 08-134717 A | 5/1996 |
| JP | 09-143816 A | 6/1997 |
| JP | 2864582 B2 | 3/1999 |
| JP | 2002173825 A * | 6/2002 |

OTHER PUBLICATIONS

Fourne, F., Synthetic Fibers, Hanser Publishing, 1999, pp. 756-760.*
Machine Translation of JP 06-306729.*
Pearce, E. M., & Lewin, M. Handbook of Fiber Chemistry. New York: Marcel Dekker. (1998). p. 842.*
European Patent Office, European Search Report issued in corresponding EP Application No. 10764646.5, dated Oct. 23, 2012.
Chinese Patent Office, Chinese Office Action issued in corresponding CN Application No. 201080025162.0, dated Dec. 5, 2012.
European Patent Office, European Office Action issued in corresponding EP Application No. 10764646.5, dated Jul. 10, 2013.
Chinese Patent Office, Communication issued in counterpart CN Application No. 201080025162.0 mailed Mar. 14, 2014.

* cited by examiner

POLYESTER FIBER FOR AIRBAG AND PREPARATION METHOD THEREOF

CROSS REFERENCE TO RELATED APPLICATIONS

This application is a National Stage of International Application No. PCT/KR2010/002301 filed Apr. 14, 2010, claiming priority based on Korean Patent Application Nos. 10-2009-0032252, filed Apr. 14, 2009 and 10-2009-0035713 filed Apr. 23, 2009, the contents of all of which are incorporated herein by reference in their entirety.

BACKGROUND OF THE INVENTION (a) Field of the Invention

The present invention relates to a polyester fiber that can be applied to a fabric for an airbag, and particularly to a high strength and low modulus polyester fiber having superior mechanical properties, dimensional stability, packing properties, and the like, a method of preparing the same, and a fabric for an airbag using the same.

(b) Description of the Related Art

Figure 1:
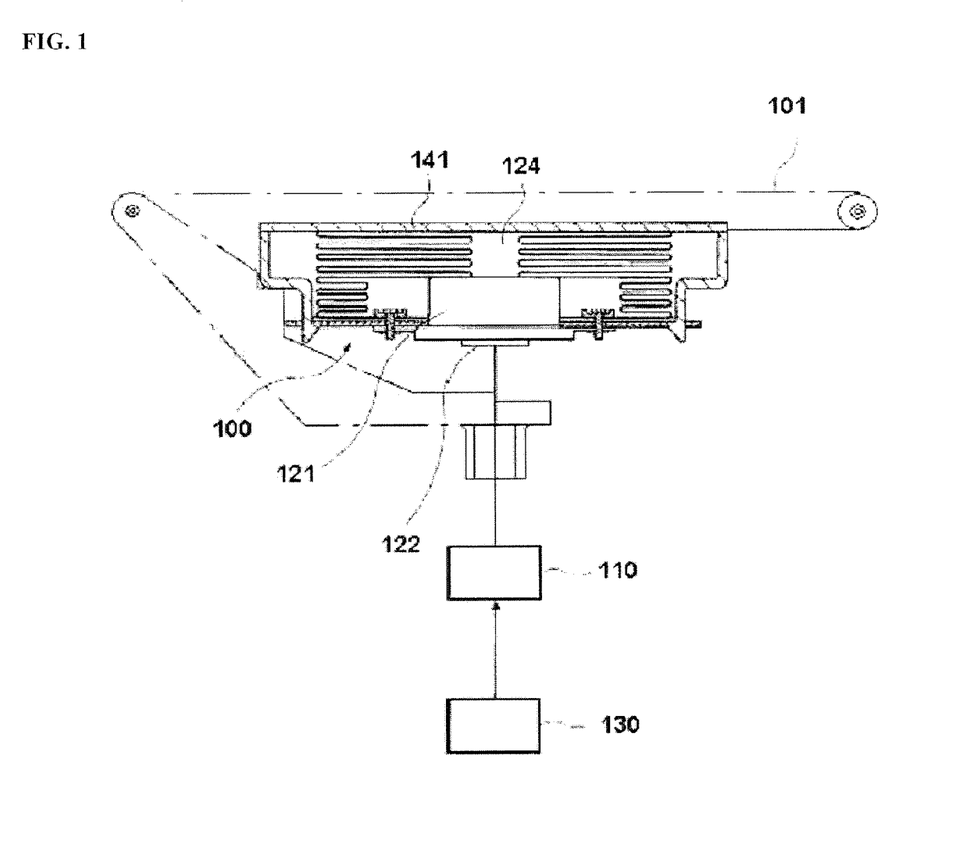
FIG. 1 is a drawing showing a conventional airbag system.

Generally, an airbag is an apparatus for protecting a driver and passengers by providing a gas into the airbag by exploding gunpowder so as to inflate the airbag after detecting a crash impact with an impact detecting sensor, when a driving car collides at a speed of about 40 km/h or more, and a structure of a conventional airbag system is depicted in FIG. 1.

As depicted in FIG. 1, conventional airbag system includes: an inflator 121 that generates a gas by ignition of a detonator 122; an airbag module 100 installed in a steering wheel 101 and including an airbag 124 that is expanded and unfolded toward a driver on the driver's seat by the generated gas; an impact sensor 130 that gives an impact signal when the car has crashed; and an electronic control module (ECM) 110 that ignites the detonator 122 of the inflator 121 according to the impact signal. In the airbag system, the impact sensor 130 detects the impact and sends the signal to the ECM when the car collides. At this time, the ECM 110 that received the signal ignites the detonator 122 and a gas generator in the inflator 121 is combusted. The combusted gas generator generates the gas rapidly and expands the airbag 124. The expanded airbag 124 contacts the front upper body of the driver and partially absorbs the impact load caused by the collision, and when the driver's head and chest go forward according to the law of inertia and smash against the airbag 124, it further absorbs the shock toward the driver by rapidly discharging the gas from the airbag through discharging holes formed on the airbag. Therefore, the airbag effectively absorbs the shock that is delivered to the driver, and can reduce secondary injuries at the time of a collision.

As disclosed above, an airbag for a car is prepared in a certain shape and is installed in the steering wheel, door roof rails, or side pillars of the car in a folded form so as to minimize its volume, and it is expanded and unfolded when the inflator 121 operates.

Therefore, it is very important that the airbag has folding properties and flexibility for reducing the shock to the occupant in addition to good mechanical properties of the fabric for maintaining the folding and packaging properties of the airbag effectively when it is installed in a car, preventing damage to and rupture of the airbag itself, providing good unfolding properties of the airbag cushion, and minimizing the impact provided to the occupant. However, an airbag fabric that can maintain superior air-tightness and flexibility for the occupant's safety, sufficiently endure the impact applied to the airbag, and be effectively installed in a car has not yet been suggested.

Previously, a polyamide fiber such as nylon 66 has been used as the raw material of the fiber for an airbag. However, nylon 66 has superior impact resistance but is inferior to polyester fiber in humid heat resistance, light resistance, and dimensional stability, and is expensive.

Meanwhile, Japanese patent publication No. Hei 04-214437 suggested a polyester fiber for reducing such defects. However, when the airbag was prepared by using a prior polyester fiber, it was difficult to install in a narrow space in a car because of its high modulus, and there was a limitation for maintaining sufficient mechanical and unfolding properties in severe conditions of high temperature and high humidity.

Therefore, it is needed to develop a fiber that maintains superior dimensional stability and gas barrier effect so as to be used for an airbag fabric, and also maintains flexibility for reducing the impact applied to passengers, the packing properties, and superior mechanical properties in the severe conditions of high temperature and high humidity.

SUMMARY OF THE INVENTION

It is an aspect of the present invention to provide a polyester fiber for an airbag that secures superior dimensional stability, flexibility, and packing properties in order to be used for an airbag fabric, and that maintains sufficient performance in severe conditions of high temperature and high humidity.

It is another aspect of the present invention to provide a method of preparing the polyester fiber.

It is still another aspect of the present invention to provide a fabric for an airbag prepared by using the polyester fiber.

The present invention provides a polyester fiber for an airbag, having elongation of 0.5% or more at a stress of 1.0 g/d, elongation of 4.3% or more at a stress of 4.0 g/d, and elongation of 7.5% or more at a stress of 7.0 g/d, and an initial modulus of 40 to 100 g/d at room temperature.

The present invention also provides a method of preparing the polyester fiber, including the steps of melt-spinning a polyester polymer having intrinsic viscosity of 0.85 dl/g or more at 270 to 300° C. so as to prepare an undrawn polyester fiber, and drawing the undrawn polyester fiber.

The present invention further provides a fabric for an airbag prepared by using the polyester fiber.

DETAILED DESCRIPTION OF THE EMBODIMENTS

Hereinafter, the polyester fiber for an airbag according to embodiments of the present invention, the method of preparing the same, and the fabric for an airbag prepared by using the same are explained in more detail. However, the following is only for understanding of the present invention and the scope of the present invention is not limited to or by them, and it is obvious to a person skilled in the related art that the embodiments can be variously modified in the scope of the present invention.

In addition, "include" or "comprise" means to include any components (or ingredients) without particular limitation unless there is no particular mention about them in this description, and it cannot be interpreted as a meaning of excluding an addition of other components (or ingredients).

After preparing a drawn yarn (namely, the fiber for an airbag) by melt-spinning a polymer including poly(ethylene terephthalate) (PET) so as to prepare an undrawn yarn and drawing the same, the polyester fabric for an airbag may be prepared by weaving the obtained polyester fibers. Therefore, the characteristics of the polyester fiber are directly/indirectly reflected in the polyester fabric for an airbag.

Particularly, in order to apply the polyester to the fiber for an airbag instead of a prior polyamide such as nylon 66, the disadvantages of the prior polyester fibers such as a low folding property according to its high modulus and stiffness, a falling off properties in severe conditions of high temperature and high humidity according to its low melt heat capacity, and a decline in unfolding performance according the same must can be overcome.

Polyester a stiffer structure than that of nylons in terms of molecular structure, and has a characteristic of high modulus. Therefore, the packing property deteriorates remarkably when it is used for fabric for an airbag and installed in a car. Furthermore, carboxyl end groups (hereinafter "CEG") in the polyester molecular chain attack ester bonds in a condition of high temperature and high humidity and cut the chain, and it becomes a cause of deterioration of the properties after aging.

Accordingly, the polyester fiber of the present invention can be effectively applied to the fabric for an airbag, because the mechanical properties such as toughness and gas barrier performance of the fabric can be maintained while the stiffness is remarkably lowered by optimizing the range of the properties of the polyester fiber, for example, the initial modulus, the elongation, and the like.

Particularly, it is revealed from the results of the present inventor's experiments that a fabric for an airbag shows more improved folding properties, dimensional stability, and gas barrier effect by preparing the fabric for an airbag from the polyester fiber having above characteristics. The fabric for an airbag can maintain superior packing properties, superior mechanical properties, air-leakage protection, insulating properties, air-tightness, and the like, even under severe conditions of high temperature and high humidity.

According to one embodiment of the present invention, a polyester fiber having specific characteristics is provided. The polyester fiber may show elongation of 0.5% or more at a stress of 1.0 g/d, elongation of 4.3% or more at a stress of 4.0 g/d, elongation of 7.5% or more at a stress of 7.0 g/d, and an initial modulus of 40 to 100 g/d at room temperature.

It is preferable that the polyester fiber includes PET as a main component. Various additives may be included in the PET during the preparing steps thereof, and thus the fiber may include the PET in the content of 70 mol % or more, and preferably of 90 mol % or more, in order to show the properties suitable for the fabric for an airbag. Hereinafter, the term PET means a polymer including PET in the content of 70 mol % or more unless any special explanation is given.

The polyester fiber according to one embodiment of the present invention may be prepared under melt-spinning and drawing conditions that will be mentioned later, and the fiber shows an initial modulus of 40 to 100 g/d and elongation of 0.5% or more when it receives a stress of 1.0 g/d, 4.3% or more when it receives a stress of 4.0 g/d, and 7.5% or more when it receives a stress of 7.0 g/d at room temperature.

The polyester generally has higher stiffness than nylons due to its molecular structure and shows a characteristic of high modulus, and it becomes difficult to install the airbag in a narrow space of a car when it is used for the fabric for an airbag because the folding and packing properties of the same deteriorate remarkably. However, the polyester fiber obtained through the controlled melt-spinning and drawing process shows the characteristics of high strength and low modulus, and shows a low initial modulus of 40 to 100 g/d, preferably an initial modulus of 50 to 100 g/d, and more preferably of 55 to 95 g/d, which is lower than known industrial polyester fibers.

The modulus of the polyester fiber means a modulus value of elasticity that is obtained from a gradient in an elastic range of a tenacity-elongation graph obtained by a tensile test, and corresponds to a coefficient value of elasticity indicating a degree of elongation and a degree of deformation when the fiber is stretched by its both side ends. Furthermore, the initial modulus of the fiber means a modulus value of elasticity at an approximate starting point of the elastic range after "0" point in the tenacity-elongation graph. When the initial modulus of the fiber is high, the elasticity is good but the stiffness of the fabric may be bad. On the other hand, when the initial modulus is too low, the stiffness of the fabric is good but the elastic recovery becomes low and the toughness of the fabric may be bad. The initial modulus value of the polyester fiber of the present invention is optimized in a much lower range than that of the prior polyester fiber for the industrial applications. As such, since the fabric for an airbag is prepared from the polyester fiber having a lower initial modulus than those of the prior fibers, the fabric can resolve the problem caused from the high stiffness of the prior polyester fabric, and then can show superior folding, flexibility, and packing properties.

In addition to the low initial modulus, the polyester fiber also has the characteristics of minimized drawing. The elongation of the polyester fiber may be 0.5% or more, for example, 0.5% to 1.5%, and preferably 0.7% to 1.2% at a stress of 1.0 g/d; 4.3% or more, for example, 4.3% to 20%, and preferably 4.3% to 15% at a stress of 4.0 g/d; and 7.5% or more, for example, 7.5% to 25%, and preferably 7.5% to 20% at a stress of 7.0 g/d, at room temperature. Accordingly, the fabric for an airbag prepared from the polyester fiber having the characteristics can resolve the problem caused by the high stiffness of the prior polyester fabric, and can show superior folding, flexibility, and packing properties.

At the same time, the polyester fiber may show more improved intrinsic viscosity than those of the prior known polyester fibers. That is, the intrinsic viscosity of the polyester fiber according to the present invention may be 0.8 dl/g or more, for example 0.8 dl/g to 1.2 dl/g, preferably 0.85 dl/g to 1.15 dl/g, and more preferably 0.90 dl/g to 1.10 dl/g. It is preferable that the intrinsic viscosity is maintained in the above range in order to prevent heat deformation in a coating process when the polyester fiber is applied to the airbag.

It is preferable that the intrinsic viscosity of the fiber is 0.8 dl/g or more so as to exhibit high strength with a low drawing ratio and satisfy the tenacity required of the fiber for an airbag. Otherwise, the polyester fiber should be processed to have a high drawing ratio to obtain the properties required of the fiber for an airbag. In the case of applying a high drawing ratio to the fiber, the degree of orientation of the fiber may be increased such that the fiber may have a high modulus. Therefore, it is preferable to apply a low drawing ratio in the drawing process so as to enable it to exhibit a low modulus by maintaining the intrinsic viscosity to be 0.8 dl/g or more. Furthermore, because the drawing tension increases during the drawing process and some problems arise on the drawing process when the intrinsic viscosity of the fiber is more than 1.2 dl/g, the intrinsic viscosity is preferably 1.2 dl/g or less. Particularly, the polyester fiber of the present invention can have low stiffness with a low drawing ratio by maintaining such high intrinsic viscosity. The polyester fiber of the present invention also has a high strength characteristic that can provide the fabric for an airbag with sufficient mechanical properties, impact resistance, toughness, and the like.

Therefore, it is possible to prepare the fabric for an airbag showing superior mechanical properties, packing properties, dimensional stability, impact resistance, and gas barrier effect at the same time by using the polyester fiber having such low initial modulus and high elongation and preferably high intrinsic viscosity. Therefore, the fabric for an airbag showing superior impact resistance, dimensional stability, mechanical properties, and air-tightness in addition to lower stiffness and superior folding, flexibility, and packing properties can be obtained by using the polyester fiber. Such a fabric can be preferably applied to an airbag, because the fabric provides good folding and packing properties when it is installed in a narrow space in a car, while showing superior mechanical properties, dimensional stability, and gas barrier effect. Also, the fabric for an airbag can protect an occupant safely by minimizing the shock applied to the occupant with its superior flexibility.

Furthermore, the polyester fiber of the present invention may show largely lessened CEG content in comparison with the prior known polyester fibers, because it is prepared under the melt-spinning and drawing conditions that will be mentioned later. That is, the CEG content of the polyester fiber of the present invention may be 50 meq/kg or less, preferably 40 meq/kg or less, and more preferably 30 meq/kg or less. The CEG in the polyester molecular chain attacks ester bonds in the conditions of high temperature and high humidity and cuts the chain, and it deteriorates the properties of the fiber after aging. Particularly, when the fiber having a CEG content of more than 50 meq/kg is applied to an airbag, the CEGs attack and cut the ester bonds of the fiber in the conditions of high humidity and the properties deteriorate. Therefore, it is preferable that the CEG content of the polyester fiber is 50 meq/kg or less.

Meanwhile, the polyester fiber according to one embodiment of the present invention may show tensile tenacity of 6.5 g/d or more, for example, 6.5 g/d to 11.0 g/d, and preferably of 7.5 g/d or more, for example, 7.5 g/d to 10.0 g/d, and elongation at break of 13% or more, for example, 13% to 35%, and preferably of 15% or more, for example, 15% to 25%. Furthermore, the dry heat shrinkage of the fiber may be 10% or less, for example, 2.0% to 10.0%, and preferably of 2.2% or less, for example, 2.2% to 10.0%, and the toughness of the fiber may be $30 \times 10^{-1}$ g/d or more, for example, $30 \times 10^{-1}$ g/d to $46 \times 10^{-1}$ g/d, and preferably of $31 \times 10^{-1}$ g/d or more, for example, $31 \times 10^{-1}$ g/d to $44 \times 10^{-1}$ g/d. As disclosed above, when the polyester fiber of the present invention is applied to the fabric for an airbag, the fiber exhibits superior performance as well as superior tenacity and other properties by securing the intrinsic viscosity, the initial modulus, and the elongation in the optimized range.

Furthermore, the shrinkage force of the polyester fiber of the present invention is preferably 0.005 to 0.075 g/d at a temperature of 150° C. corresponding to the laminate coating temperature of common coated fabrics, and also preferably 0.005 to 0.075 g/d at a temperature of 200° C. corresponding to the sol coating temperature of common coated fabrics. That is, it is possible to prevent the fabric from sagging due to heat during the coating process when the shrinkage forcees at 150° C. and 200° C. are respectively 0.005 g/d or more. It is also possible to decrease the relaxing stress during the cooling process at room temperature after the coating process when the shrinkage forcees at a temperature of 150° C. and 200° C. are respectively 0.075 g/d or less. The shrinkage force is based on a value measured under a fixed load of 0.10 g/d.

The polyester fiber may have a crystallinity of 40% to 55%, preferably of 41% to 52%, and more preferably of 41% to 50% in order to prevent deformation during a heat-treating process such as said coating process. When the fiber is applied to an airbag, it is preferable for maintaining the thermal dimensional stability that the crystallinity is 40% or more. It is also preferable that the crystallinity is 55% or less because the impact absorbing performance may decrease as the amorphous area decreases when the crystallinity is more than 55%.

Furthermore, the fineness of monofilament of the polyester fiber may be 0.5 to 20 denier, and preferably 2.0 to 10.5 denier. The polyester fiber must maintain high strength and low fineness in the aspect of packing property so that the fiber is used effectively to the fabric for an airbag. Accordingly, the total fineness of the fiber may be 200 to 1000 denier, preferably 220 to 840 denier, and more preferably 250 to 600 denier. Furthermore, it is preferable that the number of filaments of the fiber may be 50 to 240, preferably 55 to 220, and more preferably 60 to 200, because a greater number of filaments of the fiber can give a softer feel but too many filaments is not good in terms of spinnability.

Meanwhile, the polyester fiber according to one embodiment of the present invention disclosed above can be prepared by melt-spinning the polyester polymer, for example PET chips, so as to prepare the undrawn yarn, and drawing the undrawn yarn. It is possible to produce a polyester fiber having the above properties because the concrete conditions and processing methods of each of the above steps are directly/indirectly reflected in the properties of the polyester fiber, as disclosed above.

Particularly, it is revealed that it is possible to secure the polyester fiber for an airbag through the optimization of the processes, which has an initial modulus of 40 to 100 g/d and elongation of 0.5% or more at a stress of 1.0 g/d, elongation of 4.3% or more at a stress of 4.0 g/d, and elongation of 7.5% or more at a stress of 7.0 g/d at room temperature. It is also revealed that it is possible to minimize the content of the CEG through optimization of the melt-spinning and drawing processes, which exists as an acid under a high humidity condition to cause scission of basic molecular chains of the polyester fiber. Therefore, such polyester fiber shows a low initial modulus and a high elongation range at the same time, and may be preferably applied to the fabric for an airbag having superior mechanical properties, packing properties, dimensional stability, impact resistance, and gas barrier effect.

Hereinafter, the method of preparing the polyester fiber is explained in more detail.

The method of preparing the polyester fiber includes the steps of melt-spinning a polyester polymer having intrinsic viscosity of 0.85 dl/g or more at 270 to 300° C. so as to prepare a polyester undrawn yarn, and drawing the polyester undrawn yarn.

Firstly, the aspects of the melt-spinning and drawing processes of the present invention are briefly explained by referring to annexed figures so that it may easily be carried out by a person with ordinary skill in the related art.

Figure 2:
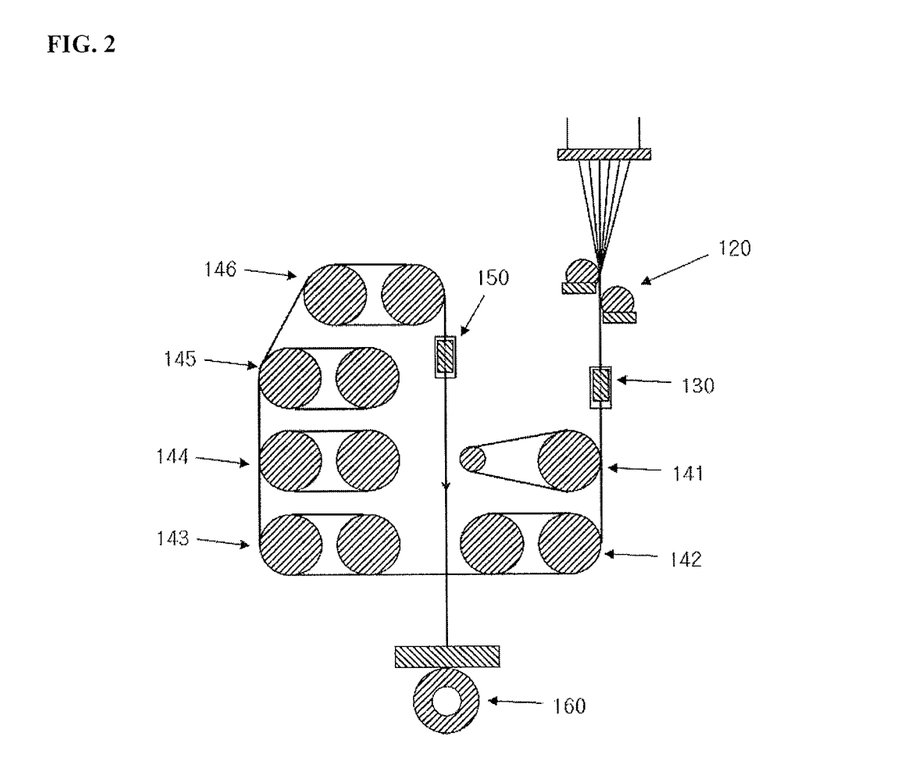
FIG. 2 is a schematic flow diagram showing a process of preparing a polyester fiber for an airbag according to one embodiment of the present invention.

FIG. 2 is a schematic drawing showing a process of preparing a polyester fiber including the melt-spinning and drawing steps according to one embodiment of the present invention. As shown in FIG. 2, the method of preparing the polyester fiber for an airbag of the present invention includes the steps of melting the polyester polymer disclosed above, spinning the molten polymer through a spinning die, cooling the spun fiber with quenching air, providing the undrawn yarn with a spinning oil by using an oil roll (or oil jet) 120, and dispersing the oil that is provided to the undrawn yarn uniformly on the surface of the fiber with uniform air pressure by using a pre-interlacer 130. After this, the present fiber may be prepared by drawing the undrawn yarn through multi-step drawing devices 141-146, intermingling the fiber at a second interlacer 150 with uniform pressure, and winding the fiber with a winder 160.

Meanwhile, the method of the present invention may use a polyester polymer having high viscosity in order to prepare the polyester fiber having high strength and low modulus that can be effectively used to the fabric for an airbag. Particularly, the polyester polymer can be prepared by adding a glycol after a polycondensation reaction during the preparation process of the polyester by using a dicarboxylic acid and a glycol. The polyester polymer prepared in this way has high intrinsic viscosity and a low CEG content and can be applied effectively to the fabric for an airbag. In particular, the polyester fiber made of the polymer having high intrinsic viscosity and a low CEG content can maintain superior mechanical properties, air-leaking prevention, air-tightness, and the like even after aging the same in severe conditions of high temperature and high humidity during the processes, and then the fabric prepared by using the polyester fiber can be effectively used for an airbag.

In the present method, the polyester polymer may be prepared by the processes including the steps of: a) carrying out an esterification reaction of the dicarboxylic acid and the glycol, b) carrying out a polycondensation reaction of the oligomer prepared by the esterification reaction, and c) adding more glycol into the polycondensated polymer and carrying out a decompressed reaction.

The dicarboxylic acid may be at least one selected from the group consisting of an aromatic dicarboxylic acid having 6 to 24 carbon atoms ($C_{6-24}$), a cycloaliphatic dicarboxylic acid having 6 to 24 carbon atoms ($C_{6-24}$), an alkane dicarboxylic acid having 2 to 8 carbon atoms ($C_{2-8}$), and ester-forming derivatives thereof. More particularly, the dicarboxylic acid or the ester-forming derivative that can be used for preparing the present polyester fiber may be a $C_{6-24}$ aromatic dicarboxylic acid such as terephthalic acid, isophthalic acid, biphenyl dicarboxylic acid, 1,4-naphthalene dicarboxylic acid, 1,5-naphthalene dicarboxylic acid, and the like, and ester-forming derivatives thereof, a $C_{6-24}$ cycloaliphatic dicarboxylic acid such as 1,4-cyclohexane dicarboxylic acid and the like, and a $C_{2-8}$ alkane dicarboxylic acid, and the like.

Among these, terephthalic acid is preferably used when considering economics and the properties of the complete product, and particularly the dicarboxylic acid including terephthalate at 70 mol % or more is preferably used when one or more compounds are used as the dicarboxylic acid.

Furthermore, the glycols used in steps a) and c) may be the same or different, and the glycol that can be used in the present invention may be at least one selected from the group consisting of a $C_{2-8}$ alkane diol, a $C_{6-24}$ cycloaliphatic diol, a $C_{6-24}$ aromatic diol, and an ethylene oxide or propylene oxide adduct thereof. More particularly, the glycol that can be used for preparing the present polyester may be a $C_{2-8}$ alkane diol such as ethylene glycol, 1,2-propane diol, 1,3-propane diol, 1,3-butane diol, 1,4-butane diol, 1,5-pentane diol, 1,6-hexane diol, and the like, a $C_{6-24}$ cycloaliphatic diol such as 1,4-cyclohexane diol, 1,4-cyclohexane dimethanol, and the like, a $C_{6-24}$ aromatic diol such as bisphenol A, bisphenol S, and the like, and an ethylene oxide or propylene oxide adduct of the aromatic diol, and the like.

The present method of preparing the polyester polymer can be the application of a terephthalic acid (TPA) method that includes esterification of a dicarboxylic acid and a glycol having two OH groups. A polyester TPA method in general is a direct reaction of the dicarboxylic acid and the glycol, and is a self acid-catalyzed reaction without using other catalysts in the esterification reaction. For example, poly(ethylene terephthalate) (PET) is directly prepared by the esterification reaction of terephthalic acid and ethylene glycol, as shown in the following Reaction Formula 1.

[Reaction Formula 1]

In such a TPA reaction, it is needed to maintain a high temperature because of the insolubility and low reactivity of the dicarboxylic acid. The oligomer prepared by the above method can be polymerized into a polymer having a specific viscosity by carrying out a polycondensation reaction at a high temperature while adding a catalyst under a high vacuum condition. The prepared polymer is discharged through a nozzle by using a gear pump or a high pressure inert gas ($N_2$). The discharged polymer is solidified in cooling water and cut into an adequate size.

However, the final polyester polymer prepared by the conventional TPA method has plenty of CEG, because the dicarboxylic acid having CEGs is used as the raw material and the esterification and polycondensation reactions at a high temperature cause thermal degradation and generate CEG in the molecules. Furthermore, when the polyester fiber having plenty of CEG is used for the fabric for an airbag, the CEG that exists as an acid under the high temperature and high humidity conditions causes the scission of the molecular chain and deteriorates the properties of the fabric, as disclosed above.

Therefore, the present invention can minimize the CEG content by adding glycol after the polycondensation reaction of the dicarboxylic acid and the glycol and carrying out the decompressed reaction for preparing the polyester polymer, form hydroxyl end groups having good reactivity through the reaction, and increase the molecular weight of the polyester polymer.

The esterification and polycondensation reactions of the dicarboxylic acid and the glycol may be carried out according to a conventional method known as the TPA method, and they are not limited particularly to special processing conditions.

However, the mole ratio of the dicarboxylic acid and the glycol may be 1:1 to 1:5, preferably 1:1.1 to 1:1.45, and more preferably 1:1.2 to 1:1.4 according to preferable embodiment of the present invention. It is preferable to maintain the mole ratio of the reactants in the range in the aspects of improving the properties and the productivity of the polymer.

The esterification reaction of said step a) may be carried out at a temperature of 230 to 300° C., and preferably of 250 to 280° C., and the reaction time thereof may be 2 to 7 hours, and preferably 3 to 5 hours. The reaction time and the reaction temperature for the esterification may be controlled in the aspects of improving the properties and the productivity of the polymer.

Furthermore, the polycondensation reaction of said step b) may be carried out at a temperature of 280 to 310° C., and preferably of 285 to 295° C., under a pressure of 0 to 10 Torr, and preferably 0 to 5 Torr. The reaction time of the polycondensation reaction may be 1 to 5, hours, and preferably 2 to 4 hours. The reaction time and the reaction temperature for the polycondensation may be controlled in the aspects of improving the properties and the productivity of the polymer.

After the polycondensation reaction, it is possible to block the CEG in the prepared polymer and increase the molecular weight of the final polymer through hydroxyl end groups prepared simultaneously, by further adding glycol therein and carrying out the additional reaction with the decompressed condition as disclosed above.

In said step c), the content of the glycol added therein may be 0.001 to 20 wt %, preferably 0.01 to 15 wt %, and more preferably 0.01 to 10 wt % with regard to the total content of the glycol used in step a). It is preferable to maintain the content of the glycol added therein in said range in the aspects of improving the properties and the productivity of the polymer.

Furthermore, the additional introduction of the glycol may be carried out while maintaining normal pressure. The additional reaction may be carried out under a decompressed condition after further adding the glycol. The additional reaction may be carried out under a decompressed condition of 1 to 10 Torr, and preferably 0 to 5 Torr. It is preferable to maintain the pressure rage in the aspects of improving the properties and the productivity of the polymer.

In said step c), the glycol may be added while maintaining normal pressure by breaking the vacuum state after finishing the polycondensation reaction. The reaction temperature in said step c) may be controlled according to the decompressed condition. Furthermore, the reaction time for the additional reaction including the introduction of the glycol in said step c) may be 5 minutes to 1 hour, and preferably 5 to 30 minutes. The reaction time and the reaction temperature in said step c) may be controlled in the aspects of improving the properties and the productivity of the polymer.

After introducing the glycol and carrying out the decompressed reaction, the intrinsic viscosity of the prepared polymer chip, namely melt-polymerized polymer chips, may be 0.4 dl/g or more, or 0.4 to 0.9 dl/g, and preferably 0.5 dl/g or more, or 0.5 to 0.8 dl/g, which is preferable in the aspect of improving the properties of the polymer.

Furthermore, according to circumstances, the present method may further include the solid state polymerization (SSP) step of the prepared polyester polymer after the decompressed reaction of said step c). The SSP reaction may be carried out at a temperature of 220 to 260° C., and preferably of 230 to 250° C., at a pressure of 10 Torr or less, for example 0 to 10 Torr, and preferably of 1.0 Torr or less. The reaction time of the SSP step may be 10 to 40 hours, and preferably 30 hours or less. The reaction time and the reaction temperature of the SSP step may be controlled in the aspects of increasing the final viscosity and the spinnability of the polymer.

The intrinsic viscosity of the polyester polymer prepared by the additional SSP reaction (SSP Chip) may be 0.7 dl/g or more, for example 0.7 to 2.0 dl/g, preferably 0.85 dl/g or more, for example 0.85 to 2.0 dl/g, and more preferably 0.90 dl/g or more, for example 0.90 dl/g to 2.0 dl/g, which is preferable for improving the properties of the fiber and the spinnability of the polymer. The intrinsic viscosity of the chip may be 0.7 dl/g or more to prepare the fiber having preferably high strength and high elongation at break. Also, the intrinsic viscosity of the chip may be 2.0 dl/g or less to prevent the scission of the molecular chain due to increasing the melting temperature of the chip, and the increase of the pressure in the spinning pack.

However, as disclosed above, it is preferable to effectively lower the modulus of the polyester fiber by using the polyester polymer having higher viscosity, for example 0.85 dl/g or more, in the process of preparing the undrawn yarn. That is, it is preferable for preparing the polyester fiber having high strength and low modulus, by maintaining the high viscosity range at maximum and applying a low drawing ratio during the melt-spinning and drawing processes. Also, it is preferably that the intrinsic viscosity is 2.0 dl/g or less in order to prevent the scission of the molecular chain due to the increased melting temperature of the polyester polymer, and the pressure increase due to the discharge rate in the spinning pack.

Furthermore, the CEG content in a molecule of the polyester polymer may preferably be 30 meq/kg or less to maintain superior properties of the polyester fiber and the fabric for an airbag, which is prepared from the polyester polymer, even in the high temperature and high humidity conditions. Particularly, it is preferable that the CEG content of the polyester polymer is maintained at the lowest range even after the melt-spinning and drawing processes. Thus, the polyester fiber finally prepared from the polymer can secure high strength, superior dimensional stability, and superior mechanical properties, as well as exhibit the superior properties even in the severe conditions. In this aspect, if the CEG content is more than 30 meq/kg, the CEG content in molecules of the final polyester fiber prepared through the melt-spinning and drawing processes may increase to excess, for example, to a range of more than 50 meq/kg. In this case, the properties of the fiber itself and the fabric prepared therefrom may be deteriorated because the ester bonds are cut by the CEG in the high humidity condition.

The polyester polymer preferably includes poly(ethylene terephthalate) (PET) as its main component, and may included 70 mol % or more of the PET, and preferably 90 mol % or more, in order to secure the mechanical properties as the fiber for an airbag.

Meanwhile, according to the method of the present invention, the undrawn yarn may be prepared by melt-spinning the polyester polymer having high intrinsic viscosity and a low CEG content.

The melt-spinning process may be carried out at a low temperature range to minimize the thermal degradation of the polyester polymer, which is preferable to obtain the polyester undrawn yarn satisfying the low initial modulus and high elongation range. Particularly, the spinning process may be carried out at a low temperature range, for example 270 to 300° C., preferably 280 to 298° C., and more preferably 282 to 298° C. It is preferable to minimize the deterioration of the properties such as the intrinsic viscosity and the CEG content of the polyester polymer having high viscosity according to the process, that is, to maintain the high viscosity and low CEG content of the polyester polymer. Here, the spinning temperature means the temperature of the extruder. When the melt-spinning process is carried out at a temperature of more than 300° C., much thermal degradation of the polyester polymer may be caused and a decrease in the intrinsic viscosity, a decrease in the molecular weight, and an increase in the CEG content may be enlarged. That is, the deterioration of the overall properties may be caused by damage in the surface of the fiber, and thus it is undesirable. Furthermore, it is undesirable that the melt-spinning process is carried out at the temperature below 270° C. because the melting of the polyester polymer may be difficult and the spinnability may be decreased due to the N/Z surface cooling. Therefore, it is preferable that the melt-spinning process is carried out in said temperature range.

As results of experiments, it is revealed that the high strength fiber can be obtained without applying a high drawing ratio in the drawing process by carrying out the melt-spinning process of the polyester fiber in such a low temperature range. Particularly, the melt-spinning process in such a low temperature range is preferable to minimize the degradation reaction of the polyester polymer, maintain the high intrinsic viscosity of the polyester polymer, and secure the high molecular weight of the polyester fiber. Furthermore, the polyester fiber satisfying the properties disclosed above can be obtained because it is possible to reduce the modulus effectively by carrying out the drawing process with the low drawing ratio.

Furthermore, the speed of the melt-spinning process of the polyester polymer may be controlled to be a low speed, for example 300 to 1000 m/min, and preferably 350 to 700 m/min. It is preferable to carry out the process under a lower spinning tension, that is, to minimize the spinning tension, by minimizing the degradation reaction of the polyester polymer. The degradation reaction of the polyester polymer can be minimized by selectively carrying out the melt-spinning process of the polyester polymer with the low spinning tension and the low spinning speed.

Meanwhile, the undrawn yarn obtained through the melt-spinning process may show intrinsic viscosity of 0.8 dl/g or more, for example 0.8 dl/g to 1.2 dl/g, preferably of 0.85 dl/g or more, for example 0.85 dl/g to 1.15 dl/g, and more preferably of 0.90 dl/g or more, for example 0.90 dl/g to 1.10 dl/g. The content of the CEG in the molecules of the undrawn yarn obtained by the low temperature spinning may be 50 meq/kg or less, preferably 40 meq/kg or less, and more preferably 30 meq/kg or less. Such CEG content in the molecules of the undrawn yarn may be maintained with the same level even in the drawn yarn, that is, the polyester fiber, which is drawn in the succeeding drawing process.

Particularly, the polyester polymer having high intrinsic viscosity and a low CEG content can minimize the difference in the intrinsic viscosity and the CEG content between the polyester polymer and the polyester fiber, by carrying out the melt-spinning process at the low temperature and maximally suppressing the thermal degradation as described above. For example, the melt-spinning and the succeeding processes may be carried out so that the difference between the intrinsic viscosity of the polyester polymer and the intrinsic viscosity of the polyester fiber becomes 0.5 dl/g or less, or 0 to 0.5 dl/g, and preferably 0.4 dl/g or less, or 0.1 to 0.4 dl/g. Furthermore, the processes may be carried out so that the difference between the CEG content of the polyester polymer and the CEG content of the polyester fiber is 20 meq/kg or less, or 0 to 20 meq/kg, and preferably 15 meq/kg or less, or 3 to 15 meq/kg.

The present invention can maintain superior mechanical properties of the polyester fiber and secure good elongation of the polyester fiber at the same time, by maximally suppressing the intrinsic viscosity decrease and the CEG content increase of the polyester polymer, and can prepare the high strength and low modulus fiber that is suitable for the fabric for an airbag.

The polyester polymer, for example the PET chip, may be preferably spun through the die to make the fineness of the monofilament in the range of 0.5 to 20 denier, and preferably 1 to 15 denier. That is, it is preferable that the fineness of the monofilament is 1.5 denier or more in order to lower the fiber scission during the spinning process and the possibility of the fiber scission due to the interference between the fibers during the cooling process. It is also preferable that the fineness of the monofilament is 15 denier or less in order to increase the cooling efficiency.

The polyester undrawn yarn may be prepared by further adding a cooling process after melt-spinning the polyester polymer. The cooling process is preferably carried out by applying cooling air of 15 to 60° C. It is also preferable to control the flow rate of the cooling air to 0.4 to 1.5 m/s according to the temperature of the cooling air. Thus, the polyester undrawn yarn showing all the properties of the present embodiment can be easily prepared.

Meanwhile, after preparing the polyester undrawn yarn through the above spinning step, the drawn yarn is prepared by drawing the undrawn yarn. The drawing process can be carried out with a drawing ratio of 5.0 to 6.0, and preferably 5.0 to 5.8. Through the optimized melt-spinning process, the polyester undrawn yarn maintains its high intrinsic viscosity and low initial modulus, and the CEG content in the molecules of the polyester undrawn yarn is also minimized. Therefore, when the drawing process is carried out with the drawing ratio of more than 6.0, it may be an excess drawing level to generate the scission or hairiness of the fiber, and the polyester fiber having low elongation and high modulus may be obtained due to the high degree of orientation of the fiber. Particularly, if the elongation of the fiber decreases and the modulus of the fiber increases by such a high drawing ratio condition, the folding property and the packing property may not be good when the fiber is applied to the fabric for an airbag. On the other hand, if the drawing process is carried out with a relatively low drawing ratio, the tenacity of the prepared polyester fiber may be partially decreased because the degree of orientation of the fiber is low. However, in the aspect of securing the superior properties, if the drawing process is carried out at the drawing ratio of 5.0 or more, the polyester fiber having high strength and low modulus suitable for the fabric for an airbag can be prepared. Therefore, it is preferable that the drawing process is carried out with the drawing ratio of 5.0 to 6.0.

According to another proper embodiment of the present invention, the method of preparing the polyester fiber may include the processes of drawing, heat-setting, relaxing, and winding through multi-step godet rollers from the melt-spinning process of the high viscosity polyester polymer chip to the winding process by the winder, in order to prepare the polyester fiber having a low modulus for satisfying the properties of high tenacity and low shrinkage at the same time by a direct spinning and drawing process.

The drawing process can be carried out after passing the undrawn yarn through the godet rollers with an oil pick-up unit at 0.2% to 2.0%.

The relaxing ratio in the relaxing process may be preferably 1% to 14%. When the relaxing ratio is below 1%, it may be difficult to exhibit the shrinkage and it is also difficult to prepare the fiber having high elongation and low modulus because of the high degree of orientation of the fiber, as in the high drawing ratio condition. On the other hand, when the ratio is more than 14%, it may be impossible to secure the workability because the trembling of the fiber on the godet rollers becomes severe.

Furthermore, the drawing process may further include the heat-setting process that heat-treats the undrawn yarn at the temperature of about 170 to 250° C. It is possible to heat-treat the fiber at a temperature of preferably 175 to 240° C. and more preferably 180 to 245° C. for the adequate progress of the drawing process. When the temperature of the heat-setting process is below 170° C., it may be difficult to obtain the shrinkage because the thermal effect is not sufficient and the relaxing efficiency falls. On the other hand, when the temperature is more than 250° C., the workability may be deteriorated because the fiber tenacity deteriorates and the generation of tar on the roller is increased At this time, the winding speed may be 2000 to 4000 m/min, and preferably 2500 to 3700 m/min.

According to still another embodiment of the present invention, the fabric for an airbag including the polyester fiber disclosed above is provided.

In the present invention, the fabric for an airbag means a woven fabric or a nonwoven fabric for preparing an airbag for a car. The fabric for an airbag of the present invention is characterized by being prepared from the polyester fiber that is prepared through above processes.

Particularly, the present invention can provide a polyester fabric for an airbag that has superior dimensional stability and air-tightness, and superior folding properties, flexibility, and packing properties, as well as superior energy absorbing ability when the airbag expands, by using the polyester fiber having high tenacity-high elongation and low modulus instead of the prior polyester fiber having high tenacity-low elongation and high modulus. Furthermore, the fabric for an airbag is not only superior in properties at room temperature but also maintains the superior mechanical properties and air-tightness even after aging in the severe conditions of high temperature and high humidity.

More particularly, the tensile tenacity of the fabric for an airbag of the present invention that is measured at room temperature according to the ASTM D 5034 method may be 220 kgf/inch or more, for example, 220 to 350 kgf/inch, and preferably 230 kgf/inch or more, for example, 230 to 300 kgf/inch. It is preferable that the tensile tenacity is 220 kgf/inch or more in the aspect of the properties required for prior airbags. It is also preferable that the tensile tenacity is 350 kgf/inch or less in the aspect of practical property exhibition.

The elongation at break of the fabric for an airbag that is measured according to the ASTM D 5034 method at room temperature may be 20% or more, for example, 20% to 60%, and preferably 30% or more, for example, 30% to 50%. It is preferable that the elongation at break is 20% or more in the aspect of the properties required for prior airbags. It is also preferable that the elongation at break is 60% or less in the aspect of practical property exhibition.

Furthermore, because the fabric expands rapidly by the gas of a high temperature and high pressure, superior tearing strength is required of the coated fabric for an airbag. Therefore, the tearing strength that represents the burst strength of the coated fabric for an airbag may be 23 kgf or more, for example, 23 to 60 kgf, and preferably 25 kgf or more, for example, 25 to 55 kgf when it is measured according to the ASTM D 2261 method at room temperature. If the tearing strength of the coated fabric is below the lowest limit, that is, below 23 kgf, at room temperature, the airbag may burst during the expansion thereof and it may cause a huge danger in function of the airbag.

The shrinkage rates in the directions of warp and weft of the fabric for an airbag according to the present invention that are measured according to ASTM D 1776 method may be 4.0% or less, and preferably 2.0% or less, respectively. It is most preferable that the shrinkage rates in the directions of warp and weft do not exceed 1.0%, in the aspect of securing the superior dimensional stability of the fabric.

The air permeability of the fabric that is measured according to ASTM D 737 method at room temperature may be 10.0 cfm or less, for example, 0 to 10.0 cfm. Particularly, the air permeability of the fabric for an airbag can be apparently lowered by forming a coating layer of a rubber material on the fabric, which is possible to lower the air permeability to near 0 cfm. However, unless the rubber-material is coated thereon, the air permeability of the non-coated fabric of the present invention that is measured according to the ASTM D 737 method at room temperature may be 10.0 cfm or less, for example, 0 to 10.0 cfm, preferably 3.5 cfm or less, for example, 0.1 to 3.5 cfm, and more preferably 1.5 cfm or less, for example, 0.5 to 1.5 cfm. If the air permeability is over 10.0 cfm, and preferably over 3.5 cfm, it may be undesirable in the aspect of maintaining the air-tightness of the fabric for an airbag.

Furthermore, the stiffness of the fabric for an airbag according to the present invention that is measured according to the ASTM D 4032 method at room temperature may be 0.2 kgf or more, for example, 0.2 to 1.2 kgf, and preferably 0.5 kgf or more, for example, 0.5 to 1.0 kgf. Particularly, the stiffness may be 1.2 kgf or less when the total fineness of the fiber is 530 denier or more, and the stiffness may be 0.8 kgf or less when the total fineness of the fiber is 460 denier or less.

The fabric of the present invention is preferable to maintain said range of stiffness in order to effectively use it for an airbag. If the stiffness is too low such as below 0.2 kgf, it may not function as a sufficient protecting support when the airbag is expanded, and the packing property may also be deteriorated when it is installed in a car because its dimensional stability deteriorates. Furthermore, the stiffness may preferably be 1.2 kgf or less, in order to prevent the fabric from becoming rigid and hard to fold and the packing property being deteriorated, and the fabric from being discolored. Particularly, the stiffness of the fabric for an airbag may be 0.8 kgf or less in the case of being 460 denier or less of total fineness, and 1.2 kgf or less in the case of being 530 denier or more of total fineness.

Furthermore, according to still another embodiment of the present invention, a method of preparing a fabric for an airbag by using the polyester fiber is provided. The present method of preparing the fabric for an airbag includes the steps of weaving a raw fabric for an airbag from the polyester fibers, scouring the woven raw fabric for an airbag, and tentering the scoured fabric.

In the present invention, the polyester fiber can be prepared into the final fabric for an airbag through a conventional weaving method and scouring and tentering processes. The weaving of the fabric is not limited to a particular type, and both weaving types of a plain type and a one piece woven (OPW) type are preferable.

Particularly, the fabric for an airbag of the present invention may be prepared through the processes of beaming, weaving, scouring, and tentering by using the polyester fiber as the warp and the weft. The fabric may be prepared by using a conventional weaving machine, but it is not limited to any particular weaving machine. However, plain fabrics may be prepared by using a Rapier Loom, a Water Jet Loom, and the like, and OPW type fabrics may be prepared by a Jacquard Loom.

Furthermore, it is preferable that the fabric for an airbag of the present invention further includes a coating layer that is coated or laminated on the surface with at least one selected from the group consisting of silicone resin, polyvinylchloride resin, polyethylene resin, polyurethane resin, and the like, but the kind of coating resin is not limited to the materials mentioned above. The resin coated layer may be formed by a knife-over-roll coating method, a doctor blade method, or a spray coating method, but it is not limited to the methods mentioned above.

The amount of the coated resin per unit area of the coating layer may be 20 to 200 $g/m^2$, and preferably 20 to 100 $g/m^2$. Particularly, the amount of the coated resin is preferably 30 $g/m^2$ to 95 $g/m^2$ in the case of the OPW type fabric for a side curtain airbag, and preferably 20 $g/m^2$ to 50 $g/m^2$ in the case of the plain type fabric for an airbag.

The coated fabric for an airbag may be prepared into a form of an airbag cushion having a certain shape through the processes of tailoring and sewing. The airbag is not limited to any particular shape, and can be prepared in a general form.

Meanwhile, according to still another embodiment of the present invention, an airbag system including said airbag is provided. The airbag system may be equipped with a common device that is well known to the related manufacturers. The airbag may be largely classified as a frontal airbag and a side curtain airbag. As the frontal airbag, there are various airbags for a driver's seat, for a passenger seat, for protecting the side, for protecting knees, for protecting ankles, for protecting a pedestrian, and the like, and the side curtain airbag protects the passenger from a broadside collision and a rollover of a car. Therefore, the airbag of the present invention includes both the frontal airbag and the side curtain airbag.

As explained, according to the present invention, the polyester fiber for an airbag that can make the fabric for an airbag having superior flexibility and folding properties as well as superior mechanical properties is provided by optimizing the initial modulus, the elongation, and the like in specific ranges.

Particularly, since the polyester fiber for an airbag is optimized to have a low modulus, high strength, and high elongation, it is possible to obtain superior dimensional stability, mechanical properties, and gas barrier effect when it is used for preparing the fabric for an airbag. It is also possible to remarkably improve the packing properties by securing superior folding properties and flexibility, and to protect the occupant safely by minimizing the impact applied to the occupant.

Therefore, the polyester fiber and the polyester fabric of the present invention can be very preferably used for preparing an airbag for a car.

EXAMPLES

Hereinafter, preferable examples and comparative examples are presented for understanding the present invention. However, the following examples are only for illustrating the present invention and the present invention is not limited to or by them.

Examples 1-5

According to the processing conditions shown in the following Table 1, esterification reactions of terephthalic acid and ethylene glycol were carried out at a temperature range of 250-280° C. for 4 hours with a mole ratio (ethylene glycol/terephthalic acid) of 1.3. After the esterification reactions, polycondensation reactions of the prepared oligomers were carried out in a temperature range of 280-290° C. for 3 hours 30 minutes so as to prepare polymers.

After the polycondensation reactions, additional ethylene glycol was introduced with a content of 1% and 3% with regard to the total content of the glycol initially introduced, respectively, in the condition of normal pressure. The additional reactions were carried out at a high vacuum of 0.5 Torr for 1 minute or more. Particularly, the additional reactions were carried out so that the intrinsic viscosity (IV) of the melt-polymerized polyester polymers (chips) prepared through the additional reactions became about 0.5-0.8 dl/g.

Furthermore, solid state polymerization reaction (SSP) were carried out at the temperature range of 220-245° C. by using the polyester polymer chips prepared by the polycondensation reactions and the additional reactions so as to prepare the SSP polyester chips having the intrinsic viscosity (IV) of 0.7-1.3 dl/g.

The SSP polyester chips were prepared into the polyester fiber for an airbag through the steps of melt-spinning and drawing as shown in FIG. 1.

Particularly, the SSP polyester chips were melted in a temperature range of 283-295° C. and the molten polyesters were discharged through a spinning die. The discharged molten polyester was passed through a delayed quenching zone composed of a hood-heater and a heat insulating plate, and was delayed-quenched.

Spinning oil was applied to the delayed-quenched polyester fibers by using a roll-type oiling apparatus. The amount of the oil was 0.8 parts by weight per 100 parts by weight of the fibers. The spinning oil was a mixture of an ethylene oxide/propylene oxide adducted diol ester (30 parts by weight), ethylene oxide adducted diol ester (15 parts by weight), glyceryl triester (10 parts by weight), trimethyl propane triester (10 parts by weight), and a small quantity of an anti-static agent The oiled fibers were passed through a pre-interlacer and drawn by using godet rollers.

After the drawing, the polyester fibers were prepared by intermingling the drawn yarns by using a second interlacer and winding the same with a winder.

At this time, the mole ratio of glycol/dicarboxylic acid, the temperature, the pressure, and the reaction time of the esterification reaction, the polycondensation reaction, the additional reaction for introducing glycol, the content ratio of the additional glycol with respect to the initial glycol, the intrinsic viscosity of the PET polymer, the CEG content in the molecules, the spinning speed, the spinning tension, and the spinning temperature of the melt-spinning process, the drawing ratio, the heat-treating temperature, and the like were as disclosed in the following Table 1, and the other conditions followed conventional conditions for preparing a polyester fiber.

C., and the intrinsic viscosity (IV) of the fiber was calculated according to the following Calculation Formula 2.

Intrinsic Viscosity (IV)={(0.0242×Rel)+ 0.2634}×F    [Calculation Formula 2]

Rel=(seconds of solution×specific gravity of solution× viscosity coefficient)/(OCP viscosity)

F=(IV of the standard chip)/(average of three IV measured from the standard chip with standard action)

3) CEG Content

The CEG content of the polyester fiber was measured according to ASTM D 664 and D 4094 methods. A fiber sample of 0.2 g was introduced into a 50 mL Erlenmeyer

TABLE 1

|  | Example 1 | Example 2 | Example 3 | Example 4 | Example 5 |
|---|---|---|---|---|---|
| Mole ratio of glycol/dicarboxylic acid | 1.3 | 1.3 | 1.3 | 1.3 | 1.3 |
| Esterification reaction temperature (° C.) | 250-280 | 250-280 | 250-280 | 250-280 | 250-280 |
| Esterification reaction time (hr) | 4 | 4 | 4 | 4 | 4 |
| Polycondensation reaction temperature (° C.) | 280-290 | 280-290 | 280-290 | 280-290 | 280-290 |
| Polycondensation reaction time (hr) | 3.5 | 3.5 | 3.5 | 3.5 | 3.5 |
| Polycondensation pressure (Torr) | 1.0 or less | 1.0 or less | 1.0 or less | 1.0 or less | 1.0 or less |
| Additional glycol/Initial glycol (%) | 1 | 1 | 3 | 3 | 3 |
| Additional reaction time (min.) | 10 | 20 | 10 | 10 | 20 |
| Additional reaction pressure (Torr) | 1.0 or less | 1.0 or less | 1.0 or less | 1.0 or less | 1.0 or less |
| Raw Chip IV(dl/g) | 0.69 | 0.71 | 0.69 | 0.71 | 0.71 |
| SSP reaction temperature (° C.) | 235 | 235 | 235 | 235 | 235 |
| SSP reaction time (hr) | 13 | 11 | 13 | 13 | 11 |
| SSP reaction pressure (Torr) | 1.0 or less | 1.0 or less | 1.0 or less | 1.0 or less | 1.0 or less |
| SSP Chip IV (dl/g) | 2.0 or less | 2.0 or less | 2.0 or less | 2.0 or less | 2.0 or less |
| PET content (mol %) | 100 | 100 | 100 | 100 | 100 |
| CEG of chip (meq/kg) | 25 | 23 | 18 | 16 | 14 |
| Spinning temperature (° C.) | 283 | 290 | 293 | 295 | 295 |
| Drawing ratio | 5.7 | 5.6 | 5.5 | 5.4 | 5.3 |
| Heat-treating temperature (° C.) | 240 | 235 | 235 | 235 | 240 |

The properties of the polyester fibers prepared according to Examples 1-5 were measured according to the following methods, and the measured properties are listed in the following Table 2.

1) Crystallinity

The density ρ of the polyester fiber was measured by a density gradient method using n-heptane and carbon tetrachloride at 25° C., and the crystallinity was calculated according to the following Calculation Formula 1.

$$X_c(\text{Crystallinity}) = \frac{\rho_c(\rho - \rho_a)}{\rho(\rho_c - \rho_a)}$$    [Calculation Formula 1]

Herein, ρ is the density of the fiber, $\rho_c$ is the density of the crystal region ($\rho_c$=1.457 g/cm$^3$ in the case of PET), and $\rho_a$ is the density of the amorphous region ($\rho_a$=1.336 g/cm$^3$ in the case of PET).

2) Intrinsic Viscosity (IV)

After extracting the spinning oil from the fiber sample with carbon tetrachloride and dissolving the fiber sample in ortho-chlorophenol (OCP) at 160±2° C., the viscosity of the fiber sample in a capillary was measured by using an automatic viscometer (Skyvis-4000) at a temperature of 25° flask and 20 mL of benzyl alcohol was introduced therein, the flask was heated to 180° C. by using a hot plate, and the temperature was maintained for 5 minutes so as to dissolve the sample completely. Then, the solution was cooled to 160° C. and 5-6 drops of phenol phthalene were added therein when the temperature reached 135° C., and the CEG content (COOH million equiv./kg of sample) was calculated from Calculation Formula 3 at the titration point where the colorless solution becomes pink by titrating the solution with 0.02 N KOH.

CEG=(A−B)×20×1/W    [Calculation Formula 3]

Herein, A is the amount (mL) of KOH that is spent in the titration for the fiber sample, B is the amount (mL) of KOH that is spent in the titration for the vacant sample, and W is the weight (kg) of the fiber sample.

4) Initial Modulus

According to the ASTM D 885 method, the initial modulus was obtained by calculating the modulus value of elasticity from a gradient in an elastic range of a tenacity-elongation graph obtained from a tensile test.

5) Tensile Tenacity and Elongation at Break

The tensile tenacity and elongation at break were measured by using a universal testing machine (Instron Co.), and the length of the fiber sample was 250 mm, the tensile speed was 300 mm/min, and the initial load was 0.05 g/d.

6) Dry Heat Shrinkage Rate

The dry heat shrinkage rate was measured for 2 minutes at a temperature of 180° C. with initial tension of 30 g by using a Testrite MK-V device (Testrite Co., England).

7) Toughness

The toughness ($10^{-1}$ g/d) was calculated by the following Calculation Formula 4.

$$\text{Toughness} = \text{Strength}(g/d) \times \sqrt{\text{ElongationatBreak}(\%)} \quad \text{[Calculation Formula 4]}$$

8) Denier of Monofilament

The denier of monofilament was measured according to the method of picking the fiber of 9000 m by using a reel, weighing the fiber to obtain the total fineness (denier) of the fiber, and dividing the total fineness by the number of filaments.

9) Elongation

After a tenacity-elongation curve was obtained by the same method same as the tensile tenacity and elongation at break, the elongation value corresponding to each load was identified in the tenacity-elongation curve.

TABLE 2

|  | Example 1 | Example 2 | Example 3 | Example 4 | Example 5 |
|---|---|---|---|---|---|
| Crystallinity (%) | 47.4 | 45.2 | 43.5 | 43.2 | 42.9 |
| IV of the fiber (dl/g) | 0.85 | 0.88 | 0.92 | 0.97 | 1.01 |
| CEG of the fiber (meq/kg) | 29 | 27 | 25 | 24 | 22 |
| Initial modulus (g/d) | 80 | 78 | 75 | 73 | 66 |
| Tensile tenacity (g/d) | 7.5 | 7.8 | 8.0 | 8.2 | 8.4 |
| Elongation at break (%) | 14 | 16 | 17 | 18 | 19 |
| Dry heat shrinkage (%) | 2.0 | 1.9 | 1.8 | 1.8 | 1.6 |
| Toughness ($\times 10^{-1}$ g/d) | 28.1 | 31.2 | 33 | 34.8 | 36.6 |
| Fineness of monofilament (de) | 7.7 | 7.7 | 8.3 | 4.2 | 4.7 |
| Total fineness (de) | 460 | 460 | 500 | 500 | 460 |
| Number of filaments | 60 | 60 | 60 | 120 | 120 |
| Elongation (%) at the stress of 1.0 g/d | 0.7 | 0.74 | 0.78 | 0.84 | 0.90 |
| at the stress of 4.0 g/d | 7.0 | 7.5 | 8.1 | 8.6 | 9.5 |
| at the stress of 7.0 g/d | 10.4 | 11.3 | 12.1 | 13.2 | 14.4 |

Comparative Examples 1-5

The polyester fibers of Comparative Examples 1-5 were prepared substantially according to the same method as in Examples 1-5, except the conditions disclosed in the following Table 3.

TABLE 3

|  | Comparative Example 1 | Comparative Example 2 | Comparative Example 3 | Comparative Example 4 | Comparative Example 5 |
|---|---|---|---|---|---|
| Mole ratio of glycol/dicarboxylic acid | 1.3 | 1.3 | 1.3 | 1.3 | 1.3 |
| Esterification reaction temperature (° C.) | 250-280 | 250-280 | 250-280 | 250-280 | 250-280 |
| Esterification reaction time (Hr) | 4 | 4 | 4 | 4 | 4 |
| Polycondensation reaction temperature (° C.) | 280-290 | 280-290 | 280-290 | 280-290 | 280-290 |
| Polycondensation reaction time (hr) | 3.5 | 3.5 | 3.5 | 3.5 | 3.5 |
| Polycondensation pressure (Torr) | 1.0 or less | 1.0 or less | 1.0 or less | 1.0 or less | 1.0 or less |
| Additional glycol/Initial glycol (%) | — | — | — | — | — |
| Additional reaction time (min.) | — | — | — | — | — |
| Additional reaction pressure (Torr) | — | — | — | — | — |
| Raw Chip IV(dl/g) | 0.69 | 0.71 | 0.69 | 0.71 | 0.71 |
| SSP reaction temperature (° C.) | 235 | 235 | 235 | 235 | 235 |
| SSP reaction time (hr) | 15 | 15 | 13 | 13 | 11 |
| SSP reaction pressure (Torr) | 1.0 or less | 1.0 or less | 1.0 or less | 1.0 or less | 1.0 or less |
| SSP Chip IV (dl/g) | 2.0 or less | 2.0 or less | 2.0 or less | 2.0 or less | 2.0 or less |
| PET content (mol %) | 100 | 100 | 100 | 100 | 100 |
| CEG of chip (meq/kg) | 30 | 23 | 20 | 17 | 15 |
| Spinning temperature (° C.) | 302 | 302 | 305 | 307 | 310 |

TABLE 3-continued

|  | Comparative Example 1 | Comparative Example 2 | Comparative Example 3 | Comparative Example 4 | Comparative Example 5 |
|---|---|---|---|---|---|
| Drawing ratio | 6.05 | 6.0 | 5.95 | 5.9 | 5.85 |
| Heat-treating temperature (° C.) | 220 | 220 | 220 | 210 | 210 |

The properties of the polyester fibers prepared according to Comparative Examples 1-5 were measured substantially according to the same method as in Examples 1-5, and the measured properties are listed in the following Table 4.

TABLE 4

|  | | Comparative Example 1 | Comparative Example 2 | Comparative Example 3 | Comparative Example 4 | Comparative Example 5 |
|---|---|---|---|---|---|---|
| Crystallinity (%) | | 48.2 | 47.9 | 47.8 | 47.3 | 47 |
| IV of the fiber (dl/g) | | 0.60 | 0.65 | 0.70 | 0.85 | 0.88 |
| CEG of the fiber (meq/kg) | | 55 | 53 | 50 | 47 | 44 |
| Initial modulus (g/d) | | 110 | 107 | 104 | 103 | 101 |
| Tensile tenacity (g/d) | | 7.5 | 7.7 | 7.9 | 8.0 | 8.3 |
| Elongation at break (%) | | 10 | 11 | 12 | 12 | 12 |
| Dry heat shrinkage (%) | | 4.0 | 3.8 | 3.6 | 4.2 | 4.3 |
| Toughness ($\times 10^{-1}$ g/d) | | 24.9 | 26.7 | 27.4 | 28.8 | 29.9 |
| Fineness of monofilament (de) | | 1.25 | 6.0 | 6.0 | 3.0 | 3.3 |
| Total fineness (de) | | 200 | 240 | 600 | 700 | 800 |
| Number of filaments | | 160 | 40 | 50 | 230 | 240 |
| Elongation (%) | at the stress of 1.0 g/d | 0.4 | 0.43 | 0.45 | 0.47 | 0.49 |
|  | at the stress of 4.5 g/d | 3.7 | 3.9 | 3.9 | 4.0 | 4.1 |
|  | at the stress of 7.0 g/d | 7.1 | 7.1 | 7.3 | 7.4 | 7.4 |

Preparation Examples 1-5

Raw fabrics for an airbag was woven from the polyester fibers prepared according to Examples 1-5 by using a Rapier Loom, and were prepared into fabrics for an airbag through the scouring and tentering processes. Then, a polyvinylchloride (PVC) resin was coated on the fabrics with a knife-over-roll coating method to obtain PVC coated fabrics.

At this time, the weaving density of warps and wefts, the weaving type, and the amount of coating resin of the fabrics were as disclosed in the following Table 5, and the other conditions for Preparation Examples 1-5 followed conventional conditions for preparing a polyester fabric for an airbag.

TABLE 5

|  | | Preparation Example 1 | Preparation Example 2 | Preparation Example 3 | Preparation Example 4 | Preparation Example 5 |
|---|---|---|---|---|---|---|
| Weaving density (warp × weft) | Warp | 53 | 53 | 53 | 49 | 49 |
|  | Weft | 53 | 53 | 53 | 49 | 49 |
| Weaving type | | Plain | Plain | Plain | Plain | Plain |
| Amount of coating resin (g/m²) | | 25 | 25 | 25 | 30 | 30 |

The properties of the polyester fabrics for an airbag prepared by using the polyester fibers of Examples 1-5 were measured by the following methods, and the measured properties are listed in the following Table 6.

(a) Tensile Tenacity and Elongation at Break

The fabric sample was cut from the fabric for an airbag and fixed at the lower clamp of the apparatus for measuring the tensile tenacity according to ASTM D 5034. Thereafter, while moving the upper clamp that holds the upper part of the fabric sample upwardly, the tenacity and the elongation at the time when the fabric sample was broken were measured.

(b) Tearing Strength

The tearing strength of the fabric for an airbag was measured according to ASTM D 2261.

(c) Shrinkage Rate

The shrinkage rates in the directions of warp and weft were measured according to ASTM D 1776. First, a sample was cut from the fabric for an airbag, and the sample was marked to indicate 20 cm that is the length before shrinkage in each direction of warp and weft. Then, after the sample was heat-treated at 149° C. for 1 hour, the length of the sample after shrinkage was measured. The shrinkage rates (%) in the directions of warp and weft were calculated by the equation of {[(length before shrinkage−length after shrinkage)/(length before shrinkage)]×100}.

(d) Stiffness

The stiffness of the fabric was measured with a circular bend method by using the apparatus for testing the stiffness according to ASTM D 4032. Furthermore, it is also possible to use a cantilever method for measuring the stiffness of the fabric, which is performed by measuring the bending length of the fabric with a cantilever measuring device having a slope of a certain angle for bending the fabric.

(e) Thickness

The thickness of the fabric for an airbag was measured according to ASTM D 1777.

(f) Air Permeability

According to ASTM D 737, after storing the fabric for an airbag at a condition of 20° C. and 65% RH for 1 day or more, pressured air of 125 Pa was applied to a circular cross-section of 38 cm$^2$ and the amount of air passed through the cross-section was measured.

TABLE 6

|  | Preparation Example 1 | Preparation Example 2 | Preparation Example 3 | Preparation Example 4 | Preparation Example 5 |
|---|---|---|---|---|---|
| Tensile tenacity (kgf/inch) | 235 | 240 | 242 | 244 | 249 |
| Elongation at break (%) | 35 | 37 | 38 | 40 | 41 |
| Tearing strength (kgf) | 15 | 17 | 19 | 19 | 21 |
| Shrinkage rate of fabric (%) Warp | 0.7 | 0.6 | 0.6 | 0.5 | 0.5 |
| Shrinkage rate of fabric (%) Weft | 0.6 | 0.4 | 0.5 | 0.4 | 0.3 |
| Stiffness (kgf) | 0.79 | 0.75 | 0.73 | 0.65 | 0.54 |
| Air permeability (cfm) | 1.4 | 1.4 | 1.3 | 1.3 | 1.2 |

Comparative Preparation Examples 1-5

The polyester fabrics of Comparative Preparation Examples 1-5 were prepared and their properties were measured substantially according to the same method as in Preparation Examples 1-5, except the polyester fibers of Comparative Examples 1-5 were used. The results of the measured properties are listed in the following Table 7.

TABLE 7

|  | Comparative Preparation Example 1 | Comparative Preparation Example 2 | Comparative Preparation Example 3 | Comparative Preparation Example 4 | Comparative Preparation Example 5 |
|---|---|---|---|---|---|
| Tensile tenacity (kgf/inch) | 220 | 222 | 225 | 227 | 229 |
| Elongation at break (%) | 23 | 24 | 24 | 26 | 28 |
| Tearing strength (kgf) | 10 | 12 | 13 | 13 | 14 |
| Shrinkage rate of fabric (%) Warp | 1.2 | 1.1 | 1.1 | 0.9 | 0.8 |
| Shrinkage rate of fabric (%) Weft | 1.1 | 1.0 | 0.9 | 0.8 | 0.7 |
| Stiffness (kgf) | 1.2 | 1.2 | 1.1 | 1.1 | 1.1 |
| Air permeability (cfm) | 1.8 | 1.8 | 1.7 | 1.9 | 2.0 |

As shown in Table 6, it can be recognized that the fabrics for an airbag of Preparation Examples 1-5 that were prepared from the polyester fibers of Examples 1-5 having high intrinsic viscosity and elongation and low initial modulus, and have very superior characteristics. Particularly, the fabrics for an airbag of Preparation Examples 1-5 have tensile tenacity of 235-249 kgf/inch, tearing strength of 15-21 kgf, and shrinkage rates in the directions of warp and weft of 0.5%-0.7% and 0.3%-0.6%, respectively. At the same time, it is also recognized that the polyester fabrics for an airbag of Preparation Examples 1-5 have superior folding and packing properties in addition to their superior dimensional stability and mechanical properties, due to their optimal range of stiffness of 0.54-0.79 kgf.

Furthermore, it is also recognized that the fabrics for an airbag of Preparation Examples 1-5 can show superior air-tightness in the range that the air permeability of the coated fabric is 1.4 cfm or less since the fabrics were prepared by using the high strength and low modulus fibers.

On the contrary, as shown in Table 7, it is recognized that the fabrics for an airbag of Comparative Preparation Examples 1-5 that were prepared by using the polyester fibers of Comparative Examples 1-5 do not satisfy such characteristics. Particularly, the fabrics for an airbag of Comparative Preparation Examples 1-5 have tensile tenacity that is similar to the fabrics of the Preparation Examples, but the shrinkage rate and the tearing strength of the fabrics are remarkably deteriorated. For the fabrics for an airbag of Comparative Preparation Examples 1-5, the shrinkage rates in the directions of warp and weft are 0.8%-1.2% and 0.7%-1.1%, respectively, and the tearing strength is 15-21 kgf. When fabrics that are inferior in shrinkage rate and tearing strength are applied to an airbag device, a problem that the airbag bursts during expansion may occur due to the deterioration of mechanical properties.

Furthermore, it is recognized that the air permeability of the coated fabric of Comparative Preparation Examples 1-5 is largely increased to 1.7-2.1 cfm and the air-tightness is bad. When the air permeability is increased, there may also be a problem that the air of the airbag leaks easily while expanding the airbag and the airbag does not act properly to protect a driver and passengers.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyester fiber for an airbag, having an elongation of 0.5% or more at a stress of 1.0 g/d, an elongation of 4.3% or more at a stress of 4.0 g/d, and an elongation of 7.5% or more at a stress of 7.0 g/d, an initial modulus of 73 to 80 g/d at room temperature, and an intrinsic viscosity of 0.8 dl/g or more,
wherein the polyester fiber comprises 70 mol % or more of poly(ethylene terephthalate) and has a total fineness of 460 to 500 denier.

2. The polyester fiber according to claim 1, which has an intrinsic viscosity of 0.9 dl/g or more.

3. The polyester fiber according to claim 1, which has a content of a carboxylic end group of 50 meq/kg or less.

4. The polyester fiber according to claim 1, which has a crystallinity of 40% to 55%.

5. The polyester fiber according to claim 1, which has a tensile tenacity of 6.5 g/d or more, and an elongation at break of 13% or more.

6. The polyester fiber according to claim 1, which is comprised of 60 to 120 filaments.

7. The polyester fiber according to claim 6, wherein a fineness of individual filament is 4.2 to 8.3 denier.

8. The polyester fiber for an airbag according to claim 1, wherein the polyester fiber comprises 90 mol % or more of poly(ethylene terephthalate).

9. A method of preparing the polyester fiber according to claim 1, including the steps of:
melt-spinning a polyester polymer having intrinsic viscosity of 0.85 dl/g or more at 270 to 300° C. so as to prepare a polyester undrawn yarn; and
drawing the polyester undrawn yarn.

10. The method according to claim 9, wherein a difference in intrinsic viscosity between the polyester polymer and the fiber is 0.5 dl/g or less.

11. The method according to claim 9, wherein content of a carboxylic end group (CEG) of the polyester polymer is 50 meq/kg or less.

12. The method according to claim 11, wherein a difference between the CEG content of the polyester polymer and the CEG content of the fiber is 20 meq/kg or less.

13. The method according to claim 9, wherein the melt-spinning process is carried out with a spinning speed of 300 m/min to 1000 m/min.

14. The method according to claim 9, wherein the drawing process is carried out with a drawing ratio of 5.0 to 6.0.

15. The method according to claim 9, wherein the drawing process is carried out after passing the undrawn yarn through godet rollers with a condition of an oil pick-up unit (OPU) at 0.2% to 2.0%.

16. The method according to claim 9, further including a heat-setting process at a temperature of 170 to 250° C. after drawing the undrawn yarn.

17. The method according to claim 9, further including a relaxing process after drawing the undrawn yarn, wherein a relaxing ratio is 1% to 14%.

18. The method according to claim 9, further including a winding process after drawing the undrawn yarn, wherein a winding speed is 2000 to 4000 m/min.

19. A polyester fabric for an airbag, including the polyester fiber according to claim 1.

20. The polyester fabric according to claim 19, of which tensile tenacity measured according to the ASTM D 5034 method is 220 kgf/inch or more.

21. The polyester fabric according to claim 19, of which tearing strength measured according to the ASTM D 2261 method is 23 kgf or more.

22. The polyester fabric according to claim 19, wherein the shrinkage rates in the directions of warp and weft measured according to the ASTM D 1776 method are 4.0% or less, respectively.

23. The polyester fabric according to claim 19, wherein stiffness measured according to the ASTM D 4032 method is 0.2 kgf or more.

24. The polyester fabric according to claim 19, wherein the air permeability measured according to the ASTM D 737 method is 10.0 cfm or less.

* * * * *